United States Patent
Sethi

(10) Patent No.: US 9,660,998 B1
(45) Date of Patent: *May 23, 2017

(54) SECURE PROXY

(71) Applicant: Amazon Technologies, Inc., Seattle, WA (US)

(72) Inventor: Tushaar Sethi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,022

(22) Filed: Oct. 2, 2015

Related U.S. Application Data

(63) Continuation of application No. 13/619,317, filed on Sep. 14, 2012, now Pat. No. 9,154,479.

(51) Int. Cl.
| | |
|---|---|
| *G06F 7/04* | (2006.01) |
| *G06F 15/16* | (2006.01) |
| *H04L 29/06* | (2006.01) |
| *H04L 9/32* | (2006.01) |
| *H04L 29/12* | (2006.01) |

(52) U.S. Cl.
CPC ........ *H04L 63/101* (2013.01); *H04L 61/1511* (2013.01); *H04L 61/2007* (2013.01); *H04L 63/0281* (2013.01); *H04L 63/20* (2013.01)

(58) Field of Classification Search
CPC ... H04L 63/101; H04L 63/20; H04L 61/1511; H04L 63/0281; H04L 61/2007
USPC .................. 726/1, 4, 12; 713/161, 162, 168
See application file for complete search history.

(56) References Cited

U.S. PATENT DOCUMENTS

| | | | | |
|---|---|---|---|---|
| 6,021,429 | A | * | 2/2000 | Danknick ......... H04L 29/12009 709/208 |
| 8,291,468 | B1 | | 10/2012 | Chickering |
| 9,154,479 | B1 | * | 10/2015 | Sethi ....................... H04L 63/08 |
| 2006/0174337 | A1 | | 8/2006 | Bernoth |
| 2008/0282344 | A1 | * | 11/2008 | Shuster ................. H04L 12/585 726/21 |
| 2009/0248842 | A1 | * | 10/2009 | Hashimoto ......... H04L 41/0893 709/221 |

(Continued)

OTHER PUBLICATIONS

U.S. Appl. No. 13/619,317, "Final Office Action", Mar. 20, 2015, 16 pages.

(Continued)

*Primary Examiner* — Aravind Moorthy
(74) *Attorney, Agent, or Firm* — Kilpatrick Townsend & Stockton LLP

(57) ABSTRACT

Methods and systems are provided herein to enable secure proxying of network traffic between trusted and untrusted environments. In particular, a secure proxy may be provided that includes a set of policies. The policies may be applicable to various network protocol layers (e.g., an application layer), network traffic types, and/or endpoint resolution. The set of policies may be used to inspect, restrict and/or modify traffic between the trusted and untrusted environment to ensure data and network security. A proxy device may use the set of policies, for example, to obtain current service-related information (such as the list of IP addresses) currently associated with a computing resource requested by an application. Such endpoint information may be used, in turn, to update a white list.

20 Claims, 11 Drawing Sheets

(56) References Cited

U.S. PATENT DOCUMENTS

| | | |
|---|---|---|
| 2011/0167475 A1 | 7/2011 | Hoover et al. |
| 2011/0239267 A1* | 9/2011 | Lyne ..................... G06F 21/46 726/1 |
| 2011/0252462 A1* | 10/2011 | Bonanno ................ H04L 63/02 726/7 |
| 2012/0090028 A1* | 4/2012 | Lapsley .............. H04L 63/1441 726/22 |
| 2012/0096184 A1* | 4/2012 | Lambert ........... H04L 29/12254 709/245 |
| 2012/0102543 A1* | 4/2012 | Kohli ..................... H04L 63/20 726/1 |
| 2012/0185950 A1* | 7/2012 | Li ........................ H04L 63/105 726/29 |
| 2012/0310880 A1* | 12/2012 | Giampaolo ....... G06F 17/30545 707/610 |
| 2013/0318343 A1 | 11/2013 | Bjarnason et al. |
| 2014/0019601 A1* | 1/2014 | Blacka .............. G06F 17/30887 709/223 |

OTHER PUBLICATIONS

U.S. Appl. No. 13/619,317, "Non-Final Office Action", Sep. 19, 2013, 13 pages.

U.S. Appl. No. 13/619,317, "Non-Final Office Action", Oct. 10, 2014, 18 pages.

U.S. Appl. No. 13/619,317, "Notice of Allowance", Jun. 5, 2015, 5 pages.

* cited by examiner

SECURE PROXY

CROSS-REFERENCE TO RELATED APPLICATIONS

This application is a continuation of U.S. patent application Ser. No. 13/619,317, filed on Sep. 14, 2012, entitled "SECURE PROXY," and issued to U.S. Pat. No. 9,154,479 on Oct. 6, 2015, the content of which is hereby incorporated by reference in its entirety.

BACKGROUND

Computing resource services, such as web services, are typically exposed to customers at known service endpoints. A service endpoint may be associated with a set of Internet protocol (IP) addresses that point to physical components/properties of a service like a particular region, datacenter, load balancer or server. Given a service endpoint, customers and their applications may be directed to the IP addresses associated with the endpoint using Domain Name System (DNS) services and network-layer routing mechanisms. Over time, the set of IP addresses associated with an endpoint may change due to service expansion, component outages, load balancing and other reasons.

Traditionally, enterprise and government backend environments have used transport-layer firewalls to restrict network traffic to only a known set of IP addresses. Such firewalls are useful in protecting backend assets located in such environment, such as critical data-handling applications, but may be insufficient for integrating such backend environments with web-based services described above. First, it is often challenging to manually update the firewalls to allow a potentially large number of dynamically-changing IP addresses associated with service endpoints. Second, transport-layer firewall rules may be insufficient to detect application-level anomalies such as data leaks.

BRIEF DESCRIPTION OF THE DRAWINGS

Various embodiments in accordance with the present disclosure will be described with reference to the drawings, in which.

DETAILED DESCRIPTION

Figure 1:
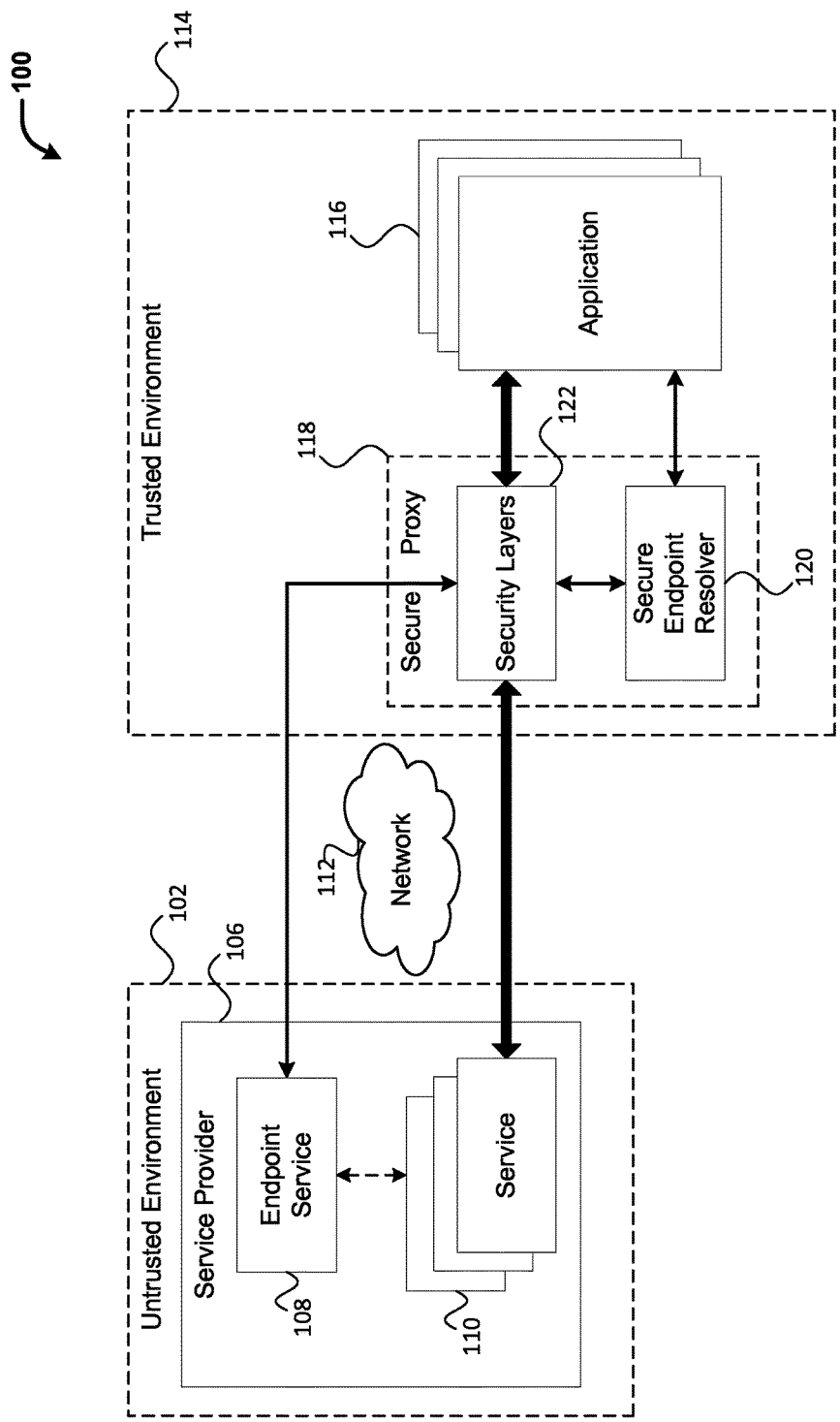
FIG. 1 illustrates an example environment in which a secure proxy may be implemented, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include a secure proxy that provides secure communication between entities in trusted environment and untrusted environment. The secure proxy may include a secure endpoint resolver and one or more security layers. The security layers may include one or more policies applicable to different network protocol layers (e.g., network, transport, application, etc.). Each policy may be associated with a set of criteria and a set of actions that may be taken upon the matching of the criteria. The policies may be provided to ensure data security and to prevent data leaks, i.e., that intended data is sent to intended places. Some or all network traffic to and/or from the trusted environment may be subject to validation by the security layers which may involve allowing, block, or modifying the network traffic according to the policies. In some embodiments, the security layers may be provided and/or updated by a service provider, a customer, a third party and the like.

In some embodiments, the secure proxy may receive an application located in a trusted environment to access a computing resource service (service) that is located in an untrusted environment. The request may specify an identifier of the service or service endpoint such as a Uniform Resource Identifier (URI). In response to the request, the secure proxy, in particular, the secure endpoint resolver may determine the requested endpoint information such as currently valid network addresses associated with the service or service endpoint. To this end, the secure endpoint resolver may query and receive responses from one or more endpoint services provided by a service provider of requested service and/or one or more Domain Name System (DNS) services that may include Domain Name System Security Extensions (DNSSEC) services. Such queries and responses may be subject to validation by the security layers. In some embodiments, the security layers may be updated to reflect the endpoint information that is resolved by the secure endpoint resolver. For example, a list validated network addresses associated with a service may be added to a whitelist to allow connection to and/or from the service.

In some embodiments, an endpoint service may provide endpoint and/or service related information. Such endpoint and/or service related information, such as a list of current Internet protocol (IP) addresses associated with a service, may change over time. Since the endpoint service may be provided by a service provider of the requested service, the information that the endpoint service provides may be considered relatively authoritative and/or authentic. In some embodiments, a service provider may provide and/or update functionalities associated with the security layers and/or secure endpoint resolver. For example, a service provider may provide or update service-specific application-level security layers. For another example, a service provider may provide endpoint service specific information to the secure endpoint resolver.

FIG. 1 illustrates an example environment 100 in which a secure proxy may be implemented, in accordance with at least one embodiment. In this example, components in a trusted environment 114 may communicate with components in an untrusted environment 102 over a network 112. As used herein, a "trusted environment" refers to a computing environment, such as a computer network, where hardware and/or software computing systems and components are physically and/or logically are protected, to some degree, from unauthorized and/or malicious intrusions from entities outside the environment. Such intrusions may include unauthorized access, use, disclosure, disruption and destruction of data and computing resources within a computing environment such as data leaks, computer viruses, denial of service (DoS) attacks and the like. Examples of a trusted environment may include a private network, corporate, enterprise or government local area network (LAN), virtual private network, wide area network (WAN) and the like. In some embodiments, a trusted environment may be used to store sensitive and/or classified information such as banking and payment information (e.g., credit card numbers), personal data (e.g., social security numbers and medical records), business trade secrets (e.g., customer lists), classified government records (e.g., intelligence reports) and the like. In other embodiments, a trusted environment may be used to run mission-critical applications such as first responder systems, stock exchange systems, defense systems and the like. In some embodiments, a trusted environment may provide compliance with industry standards or laws and regulations such as Payment Card Information Data Security Standards (PCI DSS), Health Insurance Portability and Accountability Act (HIPPA), Sarbanes-Oxley Act of 2002 (SOX) and the like.

"Untrusted environment," on the other hand, refers to a computing environment where computing components are afforded less protection from outside intrusions. Examples of untrusted environment may include a public network, the Internet, a wireless network and the like. Typically, access to data and computing resources such as servers is more restricted in a trusted environment and less restricted in an untrusted environment. It should be noted that the terms "trusted" and "untrusted" are used herein in a relative, rather than in absolute sense to refer to the overall security of an environment. For example, environment A may be a trusted environment compared to environment B but untrusted compared with environment C.

As illustrated in FIG. 1, an application 116 running in a trusted environment 114 may communicate with components such as one or more computing resource services 110 (services) provided by a computer resource provider 106 (service provider) located in an untrusted environment 102. Examples of an application 116 may include enterprise application for a business or a government, backend data processing applications, banking and payment applications and the like. Each service may provide, typically over a network, access to one or more hardware or software, physical or virtual computing resources (not shown). Services 110 may include access to computer applications such as related to email applications, e-business, communications, media and entertainment, and the like; computing platforms including operating systems, web servers, databases, programming language execution environment, and the like; computing infrastructures such as physical or virtual machines, data storage, load balancers, virtual local area networks (VLANs), data centers and the like, or any other kind of computing services deliverable over a network. In various embodiments, a network 112 may include public or private computer networks, a local area network (LAN), wireless local network (WLAN), a wide area network (WAN), a cellular data network and/or other communication network.

In various embodiments, a secure proxy 118 may be provided, for example, at the peripherals of a trusted environment 114 to inspect, validate and/or modify some or all network traffic flowing to and/or from an untrusted environment to reduce the risk of security breaches to the trusted environment, including data leaks, eavesdropping, computer viruses, denial-of-service (DoS) attacks and the like. Additionally, secure proxy 118 may provide fail-safe or fail-secure protection for systems, components and the like in the trusted environment 114. In various embodiments, some or all of components of secure proxy 118 may be implemented by computer software or hardware or both. In some embodiments, some or all components of a secure proxy 118 may be implemented as part of one or more applications 116. In other embodiments, components of secure proxy 118 may be implemented independently of the applications 116.

Secure proxy 118 may include one or more security layers 122 for inspecting or otherwise restricting network traffic at different layers of suitable network protocols such those specified by Open System Interconnection (OSI) protocols, Internet protocol suite including Transmission Control Protocol (TCP) and Internet Protocol (IP), AppleTalk, Bluetooth, IEEE 802.11 and the like. For example, security layers 122 may include a network layer firewall that inspects and/or restricts network layer packets based on information included in the packets such as source and destination IP addresses, protocol information and the like. As another example, security layers 122 may include a transport layer firewall that monitors transport layer traffic such as Transmission Control Protocol (TCP) data stream, User Datagram Protocol (UDP) communications and the like. As yet another example, security layer 122 may include an application layer firewall or filter that validate application layer traffic such based on Hypertext Transfer Protocol (HTTP), Web Distributed Authoring and Versioning (WebDAV), Telnet, File Transfer Protocol (FTP), Simple Mail Transfer Protocol (SMTP), Secure Shell (SSH), Lightweight Directory Access Protocol (LDAP), Domain Name System (DNS) protocols and the like. In various embodiments, security layers 122 may be implemented for various physical or logical entities with various granularities. For example, security layers 122 may be implemented for specific service, application, port, server host, clusters of servers, the entire site and the like or any combination thereof. In some embodiments, security layers 122 may be implemented by augmenting traditional firewalls known to those skilled in the art with techniques described herein.

In some embodiments, each of security layers 122 may be associated with a set of policies or rules governing network traffic flowing into the trusted environment (inbound traffic) and/or out of the trusted environment (outbound traffic). Each policy or rule may be associated with a set of criteria or conditions that, if matched by applicable network traffic, triggers one or more actions. In various embodiments, a policy may be configured for inbound traffic, outbound traffic or both. The set of criteria associated with a policy may specify the computer, user, program or application, service, port, protocol, type of connection and the like or any combination thereof that the policy applies to. In various embodiments, determining whether a set of criteria is met includes inspecting relevant values from attributes or data fields that are specific to a particular network protocol layers. For example, a policy applicable to a network layer may include criteria that match against fields contained in network layer packets, such as source and destination IP addresses, protocol identifier, time to live (TTL), payload data and the like. For another example, a transport-layer specific security layer may include criteria that match against connection state information derived from accumulated network packets (e.g., in memory) such as sequence numbers of packets and the like. As yet another example, an application-layer specific security layer may inspect content of application data to check for data format consistencies, detect data leaks, virus and the like.

In some embodiments, each policy may be associated with one or more actions to be performed when the associated set of criteria is matched. Such actions may include allowing, blocking or otherwise restricting network connections, modifying data included in the network traffic, providing error or warning messages (e.g., in a log, a user interface), updating security layer policies and the like. For example, in an embodiment, a policy may specify that only network connections to and/or from certain network addresses are allowed. The set of criteria for the policy may include a list of allowed network address, such as IP addresses, as well as the application(s), computer(s) and user(s) that the policy applies to. In another embodiment, a policy may specify a list of network addresses to and/or from which connections are blocked. In general, a policy may be associated with access control lists that may include a whitelist (allowed list), a blacklist (blocked list) or a combination thereof. Such a policy may apply to a particular application or program, computer, user, service, port, protocol, type of protocol and the like or any combination thereof. In various embodiments, policies, criteria, actions may be added, removed, changed or otherwise updated by a process, an administrator, a customer, a service provider and the like. As used herein, a "customer" refers to the system(s) of a customer entity (such as an individual, company or other organization) that utilizes secure proxy functionalities described herein. Such systems may include datacenters, mainframes, individual computing devices, distributed computing environments and customer-accessible instances thereof or any other system.

In some embodiments, a service provider may provide policies including criteria and/or actions for some of the security layers 122. For example, a service provider may provide policies governing application-level network traffic to ensure, for example, that inbound and/or outbound data conforms to a schema associated with a service. Such a schema may specify the methods allowed for a service, the input/output data types, the protocol used for the service and the like. In some embodiments, inbound and/or outbound data may be type-checked and/or modified to ensure that such a schema is followed. In some embodiments, policies may be based on components or properties of the service provider, the customer or customer applications, or a combination thereof. For example, policies may be specific to an endpoint, service or service provider and/or specific to a customer or customer application. For example, such policies may be based at least in part on a service level agreement between the service provider and the customer. In some embodiments, a service provider may provide a default set of policies to a customer in the trusted environment and/or periodic policy updates to the customer. In various embodiments, such service provider provided policies may be modified, customized and/or combined with existing customer firewall rules in any suitable order or priority as may be determined a service provider, a customer, a third party and the like.

In various embodiments, a computing resource service (service) 110 may be exposed to customers using a service endpoint. A service endpoint may include a network address or identifier that indicates where a computing resource service is located in a network. The network identifier may include, for example, a Uniform Resource Identifier (URI). The URI may include a scheme name (e.g., http, https), a server name (e.g., www, ftp), a network address specified in a human-memorable form such as Domain Name System (DNS) name (e.g., serviceprovider.com) or numeric form such as IP address (e.g., 123.45.678.9), a port number (e.g., 80), a path to the computing resource and the like. For example, an example URI may be http://www.serviceprovider.com:80/path/servicename. In various embodiments, a numeric-based network address may conform to any suitable IP protocols such as Internet protocol version 6 (IPv6), Internet protocol version 4 (IPv4), and the like. Where a human-memorable, character-based network address (e.g., a DNS names) is provided, it may need to be resolved to a machine-recognizable numeric-based network address (e.g., an IP address) before the network address can be used in locating a computing resource located at the network address. It should be noted that DNS names and IP addresses are used merely as examples of human-memorable and machine-recognizable network addressees, respectively. Other embodiments of human-memorable and machine-recognizable network addresses or service identifiers are also covered by this disclosure.

In various embodiments, a service endpoint may be associated with one or more IP addresses each pointing to a service component associated with the service. As used herein, a service component may refer to a physical or virtual component of the service such as a server, a component of a computer, a computer system and the like or any combination thereof. Examples of a service component may include a server, data center, load balancer, and the like. In various embodiments, multiple IP addresses may be associated with a service endpoint to improve availability, capacity, reliability and other performance characteristics of the service. For example, a service endpoint may be associated with multiple several servers or data centers located at different geographical regions, each serving a particular group of requests such as from a particular region. Over time, the set of IP addresses associated a service endpoint may change for various reasons. For example, service components may become available to provide new functionalities, increase capacity, load balancing and the like. Similarly, existing service components may become unavailable temporarily or permanently due to hardware or software failure, outages, maintenance, load balancing and the like.

In some embodiments, a service provider may provide one or more endpoint services 108 to enable a customer or a customer application to look up endpoint information regarding a particular service including the IP addresses that are currently associated with the service. Such an endpoint service 108 may include graphical user interfaces (GUIs), Web-based interfaces such as a web service, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof. In various embodiments, information provided by such endpoint service 108 is considered authoritative and/or authentic or at least given the same level of trustworthiness as the service provider of the endpoint service. In an embodiment, such an endpoint service may take as input a human-memorable network address of a service, such as a DNS name, and returns a list of machine-recognizable network addresses associated with the service such as IP addresses associated with the service. In other embodiments, the endpoint service may also provide other endpoint information such service descriptor (e.g., a Web Services Description Language file), service status, capacity, load, usage statistics and the like. In some embodiments, an endpoint service 108 may communicate with one or more services 110, for example, to receive the most up-to-date endpoint information and/or to provide endpoint-related information. In some embodiments, an endpoint service 108 may also communicate with one or more DNS servers (not shown) operated by the service provider or other entities to obtain DNS resource records. In various embodiments, endpoint service 108 may be operated by the same or different service provider that provides the services 110.

In an embodiment, an application 116 in a trusted environment 114 may initiate a connection, via a network 112, to a computing resource service 110. In some embodiments, the application's request specifies an endpoint identifier such as a network address associated with the service. In some embodiments, such endpoint identifier may include human-memorable network addresses that need to be resolved to machine-recognizable network addresses. For example, such human-memorable network addresses may include a DNS name that needs to be resolved to an IP address. Such endpoint resolution may be performed by a secure endpoint resolver 120 which may or may not be part of the secure proxy 118.

In various embodiment, a secure endpoint resolver 120 may resolve endpoint and/or service related information associated with a service. Such endpoint information may include, for example, a list of network (e.g., IP) addresses that are currently associated with a service. Endpoint information resolution may be performed in a secure fashion as described herein. In some embodiments, the secure endpoint resolver 120 may receive a request from an application 116 to connect to a service 110, the request specifying an identifier or a service or service endpoint. The secure endpoint resolver 120 may send a query request to an endpoint service 108, provided that the query request is first validated by the security layers 122. More than one query requests to more than one endpoint services may be sent. In response to a query request, an endpoint service 108 may determine current endpoint information associated with the service or service endpoint including a set of active network addresses (e.g., IP addresses), schema, protocol, availability, software/hardware characteristics and the like. The endpoint service 108 may provide such endpoint information to the secure endpoint resolver 120 in one or more responses. Coming into the trusted environment 114, the response from an endpoint service 108 may be subject to validation of the same or different security layers 122 or may not be subject to any validation before being received by the secure endpoint resolver 120. In some embodiments, the secure endpoint resolver 120 may determine the endpoint information based on the received endpoint information and provide such information to the requesting application 116. Such determination may be based on security layer policies, priority or order provided by the endpoint service 108 or a customer or any suitable algorithms. In some embodiments, in addition to or instead of querying endpoint services 108, the secure endpoint resolver 120 may query DNS servers, some of which may support Name System Security Extensions (DNSSEC). In an embodiment, the secure endpoint resolver 120 is configured to authenticate information received from DNSSEC servers. For example, the secure endpoint resolver 120 may be configured to perform cryptographic functions necessary to verify digital signatures provided by DNSSEC servers using predetermined algorithms, as well as intermediate DNSSEC queries to form an authentication chain. In some embodiments, a secure endpoint resolver 120 may determine trusted network addresses based at least in part on results from both endpoint services and DNSSEC servers. For example, in an embodiment, the secure endpoint resolver 120 may obtain or derive a first set of network addresses from one or more endpoint services 108 and a second set of authenticated network addresses from DNSSEC servers and determine trusted network addresses based on the two sets. For example, the secure endpoint resolver 120 may take the intersection or the union of the two sets, or take some network addresses from either or both sets (e.g., giving preference to one of the sets).

In some embodiments, policies associated with security layers 122 may be updated based at least in part on endpoint information received by the secure end resolver 120. In some embodiments, policies may be updated to allow connections to at least some of the network addresses determined to be trusted by the secure endpoint resolver 120. For example, in an embodiment, some or all of the trusted network addresses may be added to a whitelist and/or removed from a blacklist associated with the requesting application. For another example, network addresses not determined to be trusted may be removed from a whitelist and/or added to a blacklist. In some other embodiments, policies may be updated based on other endpoint information. For example, if endpoint information includes new or updated service schema information, application level policies may be changed to ensure conformity with such a schema.

In some embodiments, once the secure endpoint resolver 120 provides a resolved endpoint information such as network addresses associated with a service 110 to an application 116, a connection may be established between the application 116 and the service 110. Such a connection may include a secure connection based on a cryptographic protocol such as Transport Layer Security (TLS), Secure Sockets Layer (SSL), Internet Protocol Security (IPsec) and the like. In various embodiments, subsequent data communication between the application 116 and the service 110 is proxied through the secure proxy 118 as illustrated by the thicker line in FIG. 1. For example, such proxying may include decrypt and/or encrypt network traffic between the application 116 and the service 110 and applying relevant polies associated with the security layers 122 as described herein.

Figure 2:
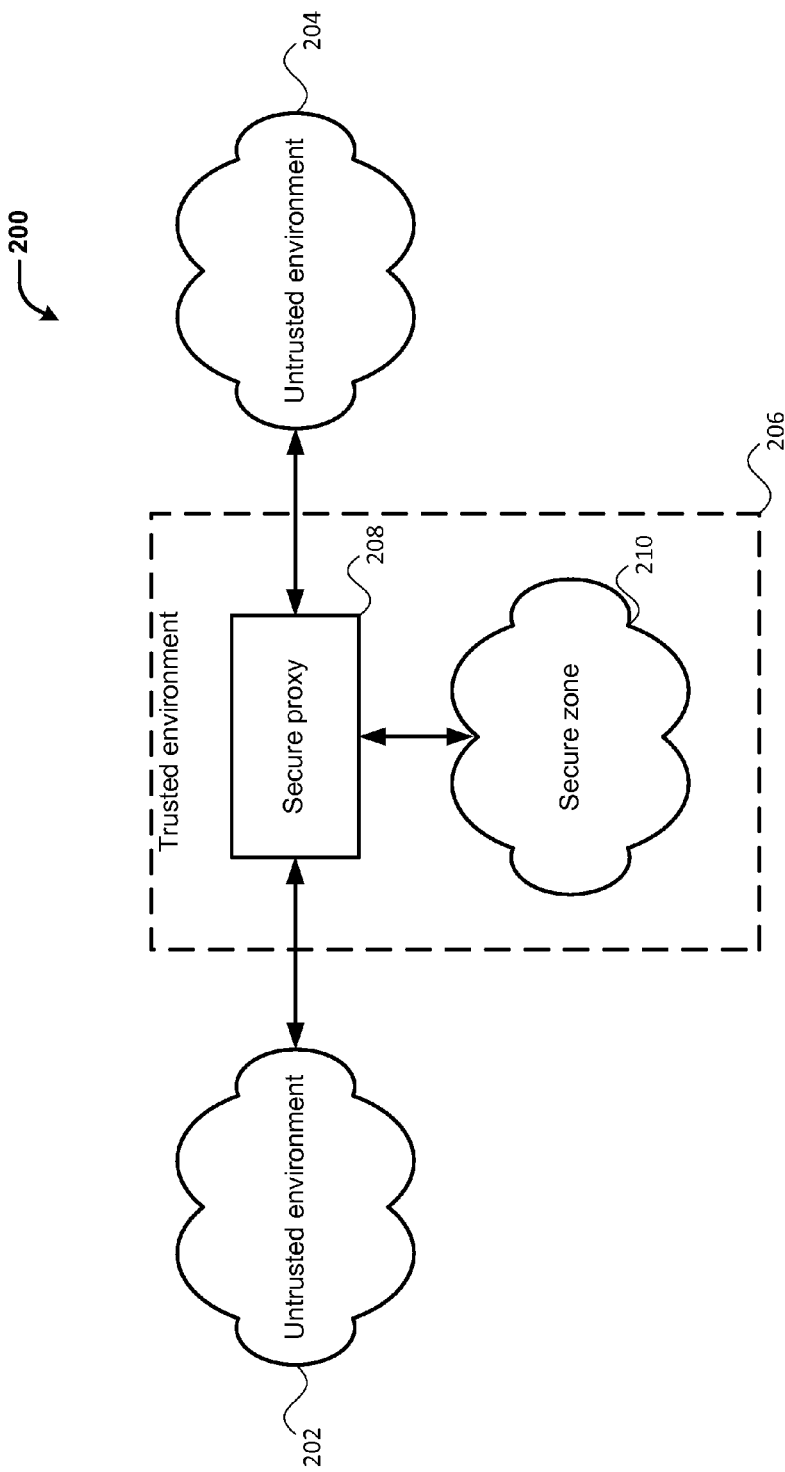
FIG. 2 illustrates an example environment, in which a secure proxy may be implemented, in accordance with at least one embodiment.

FIG. 2 illustrates another example environment 200, in which a secure proxy may be implemented, in accordance with at least one embodiment. In this example, entities in untrusted environments 202 and 204 may communicate, through secure proxy 208, with entities in a secure zone 210. The secure proxy 208 may be similar to the secure proxy 118 as described in connection with FIG. 1. Secure proxy 208 and secure zone 210 may be located in a trusted environment 206 that is protected physically and/or logically from outside intrusions. In an embodiment, entities in untrusted environment 202 may communicate with entities in untrusted environment 204 through the trusted environment. For example, in an embodiment, untrusted environment 204 may include a payment partner network such as a credit card provider's LAN or a banking system network. The secure zone 210 may include a small, tightly controlled and/or physically separated network where highly sensitive customer data such as credit card and banking information is stored. The untrusted environment 202 may include a public network such as the Internet where services such as described in connection with FIG. 1 are offered. In such an embodiment, environment 204 may be more secure than environment 202 but they may be both untrusted environments compared with environment 206 which is afforded the highest level of protection. In this embodiment, services in 202 may be used to gather customer information, which may be stored and/or processed in secure zone 210. On the other hand, banking or payment applications in untrusted environment 204 may retrieve such information from secure zone 210 for backend processing and/or may provide the results of such processing to the secure zone 210. Subsequently, such results may be retrieved by services in untrusted environment 202 and provided to customers.

Figure 3:
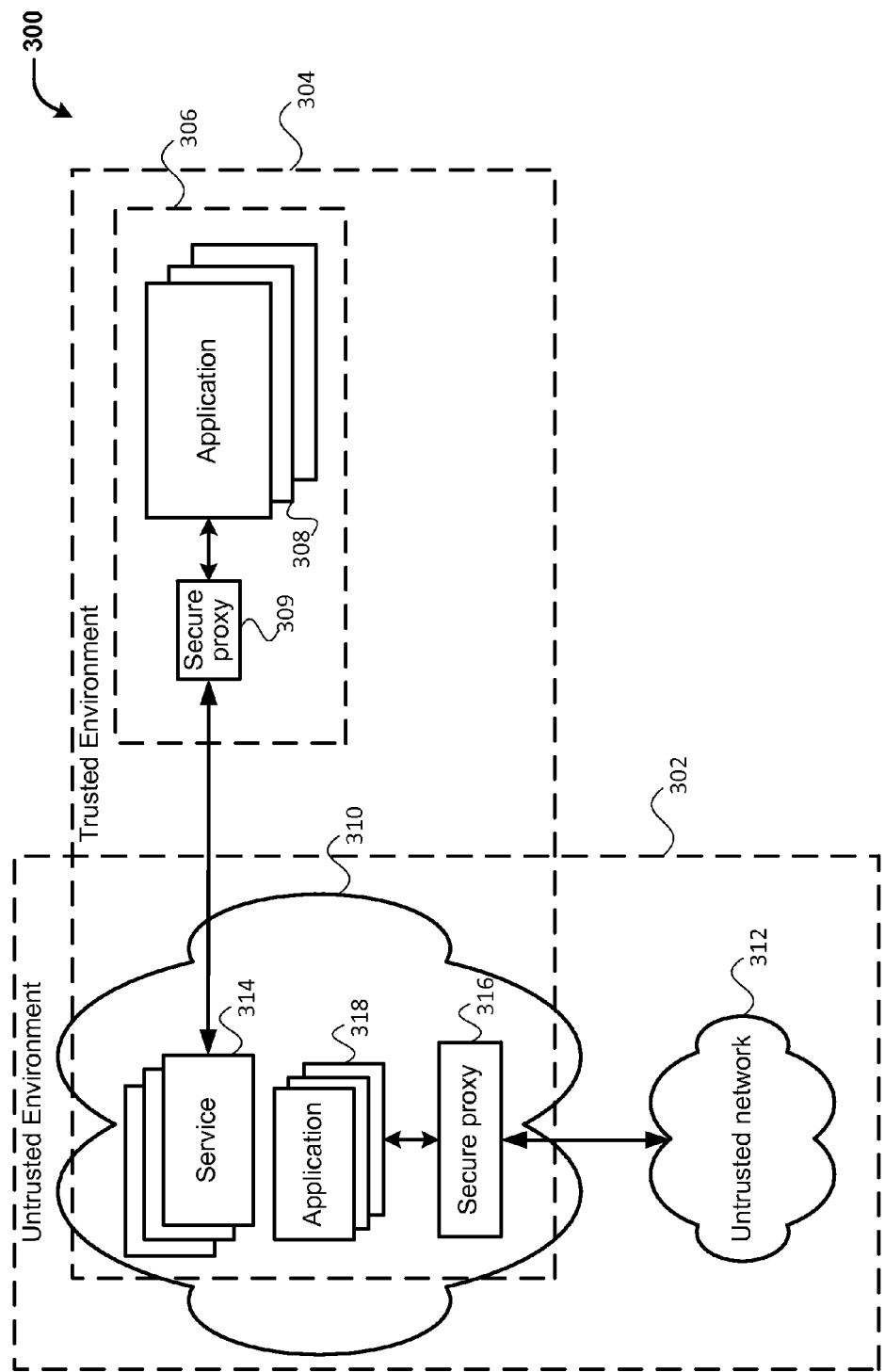
FIG. 3 illustrates an example environment, in which a secure proxy may be implemented, in accordance with at least one embodiment.

FIG. 3 illustrates another example environment 300, in which a secure proxy may be implemented, in accordance with at least one embodiment. In this example, one or more applications 308 may communicate, through secure proxy 309, with one or more services 314 over an untrusted network such as the Internet using a secure tunneling protocol thereby providing the functionalities of a virtual private network (VPN), for example. The one or more services 314 may include services provisioned from a service provider as described in connection with FIG. 1 or frontend services provided by the same entity that provides the applications 308. The applications 308 may include backend applications protected by one or more firewalls an environment 306 that is physically or logically separate from the network 310. Network 310 may include an untrusted network such as a service provider network which may be located in an untrusted environment 302 such as a public network. Network 310 may include one or more applications 318 that may be operated by a same or different entity as that for applications 308. For example, applications 318 may provide frontend and/or auxiliary functionalities while applications 308 may provide backend processing functionalities. Applications 318 may communicate, through secure proxy 316, with other entities in the untrusted environment 302 such as customers, services provided by other service providers and the like. For example, applications 318 may communicate with entities in one or more untrusted network 312. The secure proxies 309 and 316 may be similar to the secure proxy discussed in connection with FIGS. 1 and 2. As shown in FIG. 3, one or more secure proxies may be implemented at the peripherals of one or more trusted environments or networks to ensure network and/or data security of the trusted environments. Such secure proxies may implement more or less restrictive policies governing network traffic based at least in part on the relative security requirement or trust levels of the trusted environments.

Figure 4:
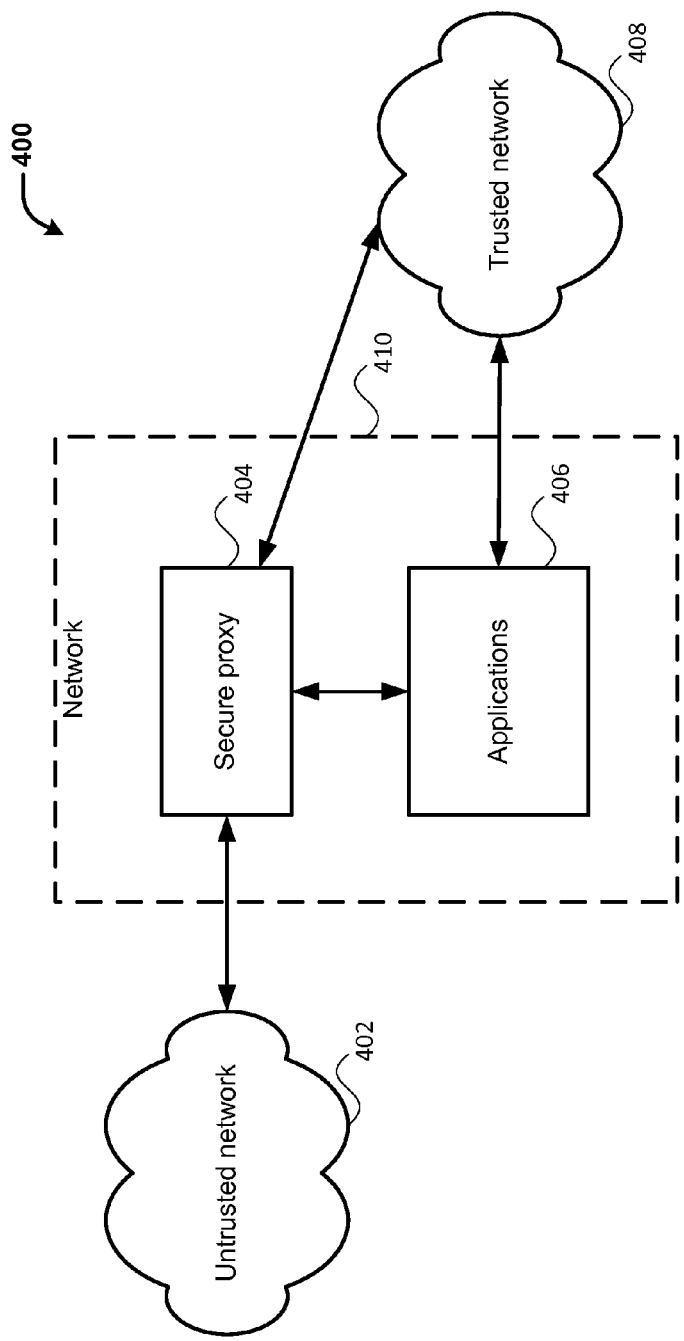
FIG. 4 illustrates an example environment, in which a secure proxy may be implemented, in accordance with at least one embodiment.

FIG. 4 illustrates another example environment 400, in which a secure proxy may be implemented, in accordance with at least one embodiment. In this example, an entity operating a trusted network 408, such as a corporate LAN or other restricted data networks, may expose certain applications 406, such as web servers, mail servers, FTP servers and the like, to untrusted network 402 through a secure proxy 404. The applications 406 and secure proxy 404 may be located in network 410 that is physically and/or logically separate from the trusted network 408 to provide isolation and protection of the latter. Such a network 410 may include a demilitarized zone (DMZ). The trusted network 408 may also communicate with the untrusted network 402 through secure proxy 404.

Figure 5:
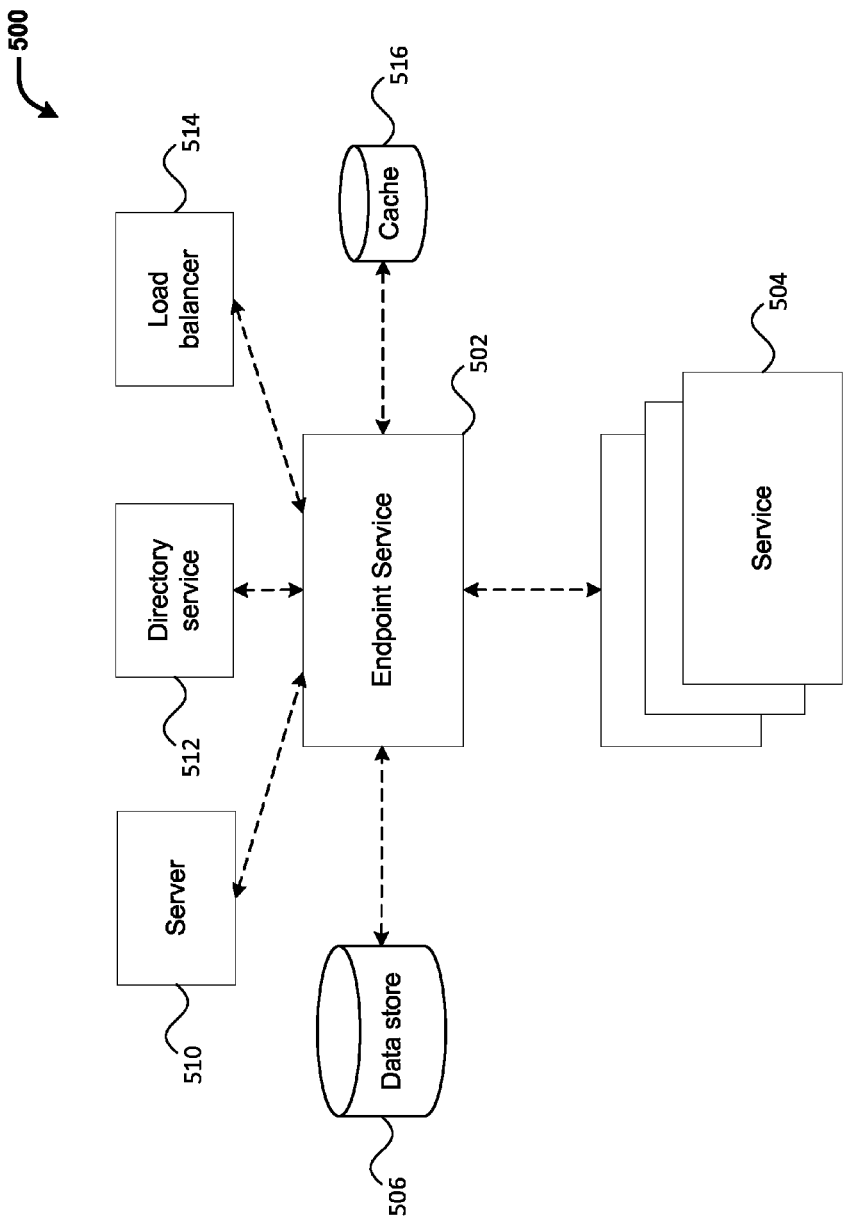
FIG. 5 illustrates an example implementation of an endpoint service, in accordance with at least one embodiment.

FIG. 5 illustrates an example implementation of an endpoint service, in accordance with at least one embodiment. The illustrated embodiment may be implemented in an environment such as described in connection with FIGS. 1-4. In this example, an endpoint service 502 provides endpoint and/or service related information for one or more services 504 in a similar manner as described in connection with FIG. 1. In various embodiments, endpoint service 502 may be provided by the same or different service provider or providers that provide the services 504. In addition, the endpoint service 502 may be implemented as a separate service or as part of another service as a method or a routine, for example. As discussed in connection in FIG. 1, an endpoint service 506 may provide an interface such as an API for a customer or customer application to obtain endpoint information related to a particular service. For example, an endpoint service 508 may receive a request that identifies a service such a human-memorable service endpoint identifier (e.g., URI) and in response to the request, provide endpoint information that includes a list of machine-recognizable network addresses (e.g., IP addresses) currently associated with the service.

In various embodiments, endpoint information for a particular service may include a list of network addresses currently associated with a service. Furthermore, endpoint information may include other service related information such as a schema or descriptor of the service (e.g., a Web Services Description Language or WSDL file), hardware and/or software characteristics associated with the service and/or service components such as availability, capacity, protocols, usage and/or performance statistics, and the like. In some embodiments, endpoint information provided by an endpoint service may be sorted, ranked or otherwise organized in any suitable manner before being provided. For example, a response provided by an endpoint service 502 may include a list of IP addresses ranked in descending order by server load/capacity associated with the servers at the IP addresses.

In some embodiments, an endpoint service 502 may provide endpoint information based at least in part on information gathered from various sources. Any of these sources may be provided by the same or different entity or entities for the endpoint service 502 and/or for the services 504. For example, the endpoint service 502 may communicate with one or more directory services 512 including DNS services, Active Directory and the like. Specifically, the endpoint service may obtain domain software/hardware information of a server from a domain controller or resolve a DNS name from a DNS server, for example.

In some embodiments, an endpoint service 506 may attempt to communicate with one or more servers 510 located at certain IP address, for example, to determine whether the servers are running and/or to retrieve current server-related information. The endpoint service 506 may also communicate with one or more load balancers 514, for example, to determine a set of suitable servers associated with a service. The endpoint service 506 may also communicate with a remote or local data store 506 that may contain information such as service configuration, customer information, policy information, metering and accounting information, usage information and the like. The endpoint service may also communication with a cache 516 to store and retrieve service-related information. In some embodiments, an endpoint service 506 may also communicate with the services 504 through service-provided interfaces to obtain current service-specific information. In some embodiments, an endpoint service 506 may communicate with entities other than those described above to obtain current service-related information.

In various embodiments, an endpoint service 502 may combine information thus gathered in any suitable manner and provides such information to a requesting entity, for example. In some embodiments, an endpoint service 502 may provide endpoint information based at least in part on information included in the request to the endpoint service, such as client IP address, client identity and other information. For example, if a client IP address indicates that the request comes from Africa, then the endpoint service 502 may only provide a list of servers located in Africa or provide those servers at the top of the list. For another example, the endpoint service 502 may select the servers based on access rights associated with a client. In some embodiments, the request may specify a maximum number of network addresses that the client needs or one or more criteria that the returned set of servers must meet including bandwidth, capacity, geographic region, security, availability and the like. In other embodiments, an endpoint service 502 may provide endpoint information based on other factors such as the time of the day or year, industry or regulatory requirement and the like, and/or according to any suitable algorithm such random selection, statistical analysis and the like. In some embodiments, responses from an endpoint service 502 may include DNS resource records or information derived from DNS resource records.

In some embodiments, an endpoint service 502 may be configured to perform one or more cryptographic operations such as encryption, providing a digital signature or digest and the like. Such operations may render the responses tamper-resistant and/or inaccessible to unintended entities.

Figure 6:
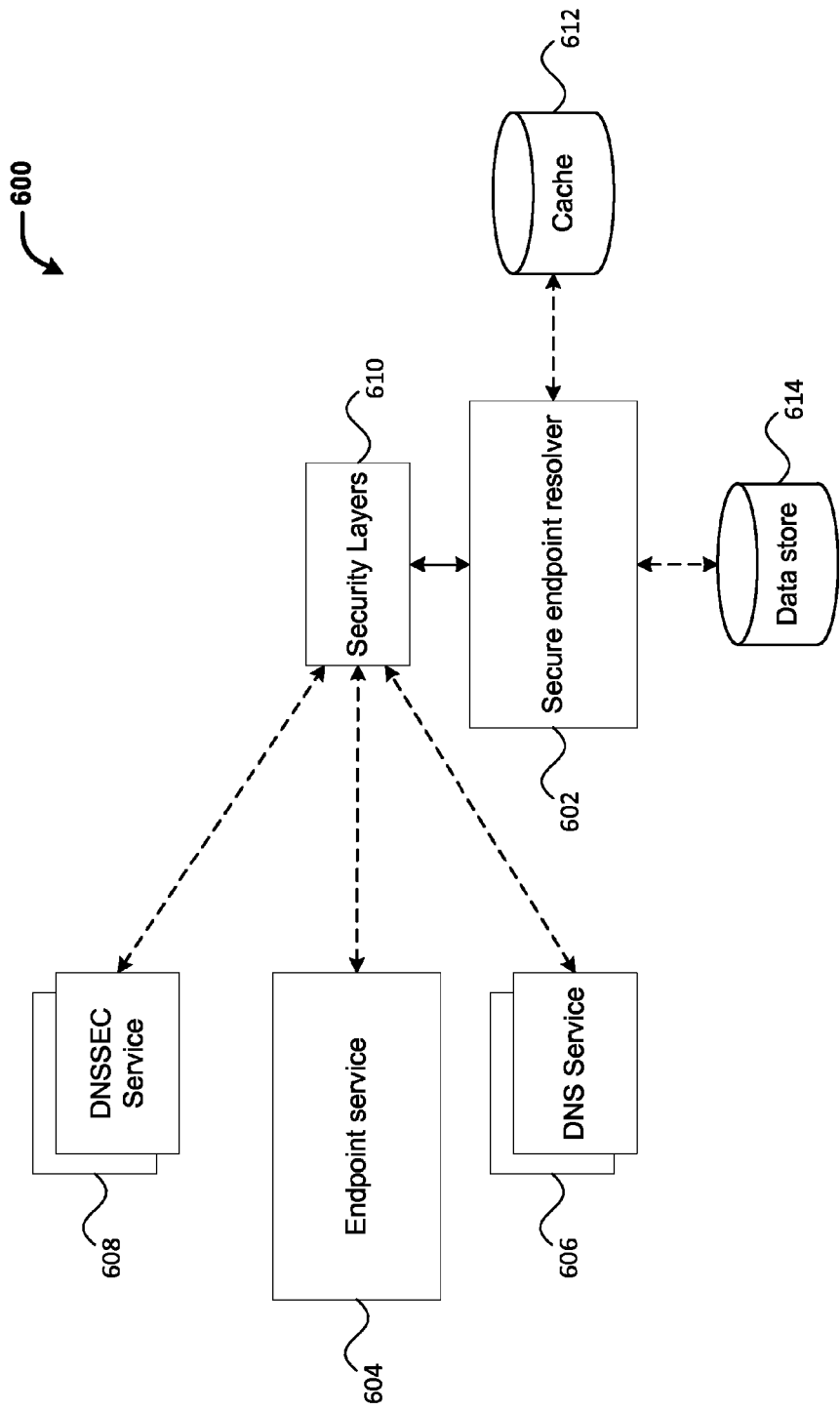
FIG. 6 illustrates an example implementation of a secure endpoint resolver, in accordance with at least one embodiment.

FIG. 6 illustrates an example implementation of a secure endpoint resolver, in accordance with at least one embodiment. The illustrated embodiment may be implemented in an environment such as described in connection with FIGS. 1-4. In this example, a secure endpoint resolver 602 may communicate, through security layers 610, with one or more endpoint services 604, one or more directory services such as DNS services 606 and DNSSEC services 608, or other similar services or components to obtain endpoint-related information such as a set of IP addresses currently associated with a service or service endpoint. In some embodiments, the functionalities of the one or more endpoint services 604 may be similar to that described in connection with FIG. 5. In some embodiments, the security layers 610 and secure endpoint resolver 602 may be similar to that described in connection with FIG. 1. In various embodiments, secure layers 610 and secure endpoint resolver 602 may be implemented by the same or different physical or logical collection of processes, computers or systems and the like.

In an illustrative embodiment, the secure endpoint resolver 602 may also be connected to one or more data stores 614. A data store 614 may be used to store endpoint information received by the secure endpoint resolvers 602 such as responses from endpoint service 604, resource records from one or more DNS services 606 or DNSSEC services 608. In some embodiments, such information may be associated with the requesting application, process or the like. In some embodiments, a data store 614 may contain information that may facilitate the authentication of endpoint information such as relevant parameters, cryptographic keys, security certificates, credentials, authentication or encryption/decryption algorithms and the like. In particular, data store 614 may include authentication credentials and/or cryptographic keys necessary to communicate with endpoint service 604. For another example, data store 614 may include cryptographic keys to authenticate resource records from a DNSSEC service 608. In some embodiments, the secure endpoint resolver 602 may also be connected to a cache 612 that stores received endpoint information to expedite the response time for subsequent endpoint queries. In some embodiments, data stored in cache 612 may be valid only for a limited period of time to prevent the use of stale data. For example, data stored in cache 612 may be associated with a Time to Live (TTL) value, such as 30 seconds, beyond which the data is no longer valid.

In some embodiments, the secure endpoint resolver 602 may be configured to connect to predetermined endpoint resolution entities such as endpoint services 604 and/or a DNSSEC service 608 based on configurable information (e.g., stored in data store 614). In some embodiments, such configurable information may include a configuration file provided and/or updated by a service provider, a system administrator or a third party provider. Such configurable information may include network address such as an IP address or a URI for endpoint resolution entities, cryptographic keys and other parameters.

In some embodiments, the secure endpoint resolver 602 may be configured to communicate with various sources such as one or more endpoint services 604, traditional DNS services 606 and/or DNSSEC services 608. In some cases, secure endpoint resolver 602 may decrypt, authenticate, validate, combine or otherwise process responses received from any of these sources to determine current endpoint information which may include the current set of IP addresses associated with a service. In some embodiments, such responses may be validated by security layers before and/or after the responses are processed by the secure endpoint resolver 602. In some embodiments, the secure endpoint resolver 602 may change or cause changes to security layers based on the endpoint information. For example, the security layers 610 may be updated to allow network traffic to and/or from a set of IP addresses determined to be currently associated with a service. In some embodiments, some or all of the endpoint information associated with a service may be provided to an application to enable it to establish a connection with the service based on the endpoint information.

Figure 7:
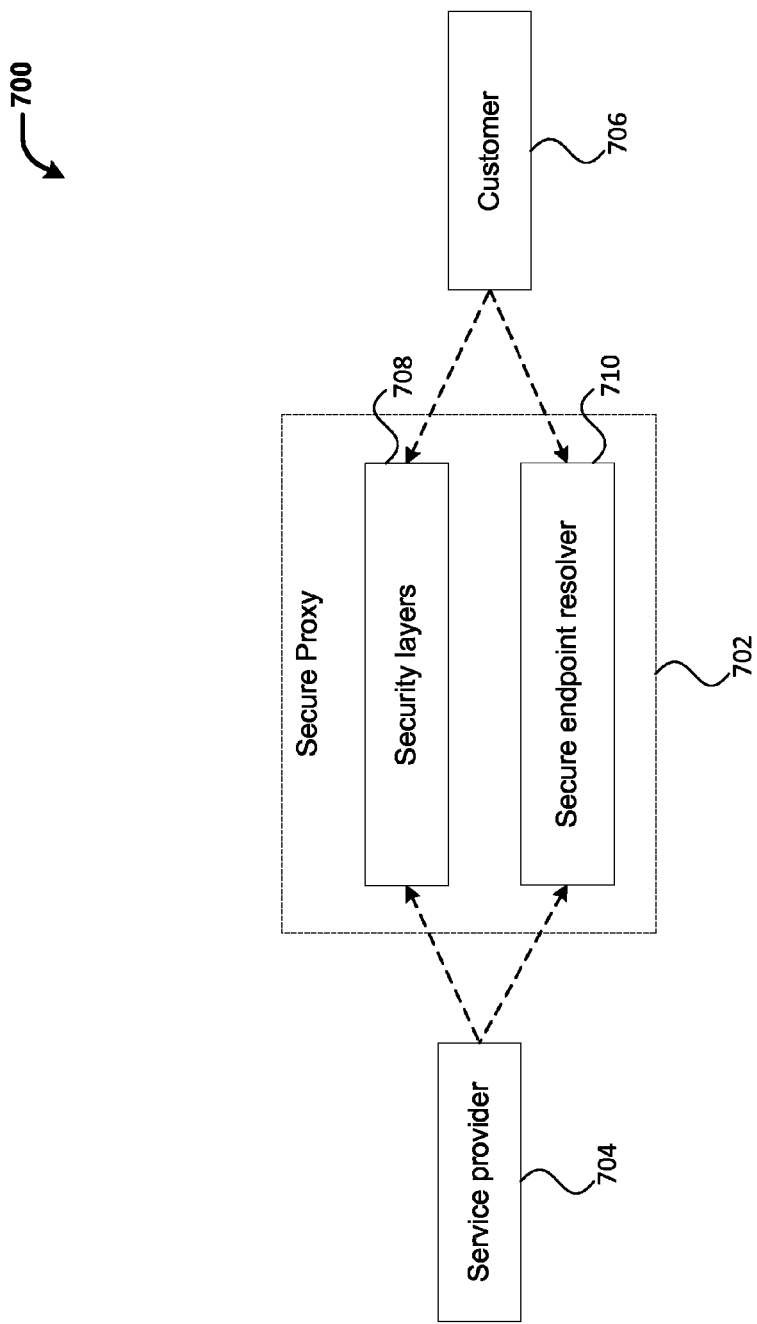
FIG. 7 illustrates installation of secure proxy, in accordance with at least one embodiment.

FIG. 7 illustrates installation of a secure proxy, in accordance with at least one embodiment. In various embodiments, various components of a secure proxy 702, such as security layers 708 and secure endpoint resolver 710, may be installed, updated or otherwise configured by various entities. Some or all of these installations, updates or configurations may be performed together or asynchronously. For example, in an embodiment, one or more components of a secure proxy 802 may be installed as part of the installation of an application.

In some embodiments, one or more service providers 704 may provide default implementation of secure proxy 702. Such default implementation may include default implementations for security layers 708 and/or secure endpoint resolver 710. The default implementation may be provided, for example, in the form of installer files, configuration files or any other format stored in one or more computer-readable media. In various embodiments, the default implementation of secure proxy 702 may be installed on one or more computer systems operated by a customer of the service provider 704 by the customer, the service provider 704 or a third party. Such default implementation may be provided to replace or augment any existing software/hardware installed on the customer's computer systems such as a firewall, a DNS resolver application or the like. In some embodiments, the functionalities provided in the default implementation of the secure proxy 702 may be customized for a particular service, customer, application, networking or computing environment or configuration and the like or any combination thereof.

In some embodiments, the default implementation of a secure endpoint resolver 710 may enable the secure endpoint resolver 710 to perform some or all of the endpoint lookup functionalities described herein. For example, the default implementation of the secure endpoint resolver 710 may allow the secure endpoint resolver 710 to query certain default endpoint services for endpoint information related to services provided by the service provider 704. For example, the default implementation may include a map that associates services with endpoint services that provides information related to the services. In another embodiment, the default implementation may provide functionalities related to the querying of DNS (including DNSSEC) services. For example, the default implementation may include cryptographic keys, encryption algorithms and the like, for example, as may be required to handle DNSSEC-related transactions.

In some embodiments, the default implementation of security layers 708 may provide validation functionalities specific to one or more network protocol layers as described in connection with FIG. 1. For example, in some embodiments, the default implementation may provide an application layer security layer that includes policies and associated actions that are specific to services provided by a service provider. For example, such policies may be used to validate that application data going to a particular service conforms to schema definitions, protocols and the like proscribed by the service. For example, a policy may specify protocols (e.g., HTTP), content type (e.g., XML), port number (e.g., 80), allowed methods, request and response format, input/output data types and the like associated with a service. For another example, a policy may validate the network address and/or port number of outbound data to ensure that data is not transmitted to unauthorized destinations. For yet another example, a policy may validate the types of data fields in outbound data to prevent leak of sensitive data (e.g., customer credit card numbers being passed as telephone numbers). In other embodiments, the default implementation of security layers 710 may include functionalities targeted for non-application layer network protocol layers such as transport layers, network layers. In various embodiments, policies and actions may include configuration files in various formats such as Extensible Markup Language (XML), JavaScript Object Notation (JSON) and the like.

The default implementation of security layers 710 may provide secure proxy functionalities for inbound data, outbound data or both. In some embodiments, security layers 708 may provide functionalities such as encryption, decryption, authentication and the like to enable proxying of a secure connection between a service and an application. Information necessary to perform such functionalities (e.g., credentials, cryptographic keys) may be provided by a customer, a service provider or a third party. In various embodiments, the default implementation of security layers 710 may be provided to a customer as separate installations or to augment existing software and/or hardware firewalls that the customer may have.

In some embodiments, the default implementation of a secure proxy 702 may be provided and/or installed at least in part by a customer 706. In other embodiments, default implementation provided by a service provider 704 may be further configured or customized by a customer 702. For example, a customer 706 may add, remove or modify policies (e.g., whitelist, blacklist) and actions associated with some of the default security layers 708 for a particular application, computer, computer systems and the like. As another example, the functionalities of a secure endpoint resolver may be configurable by a customer. For example, a customer may add, remove or modify endpoint service information required by a secure endpoint resolver 710. In some embodiments, a customer 706 may have the administrative control over various aspects (such as the timing, location and content) of the installation, configuration and/or updates of components of a secure proxy 702.

Figure 8:
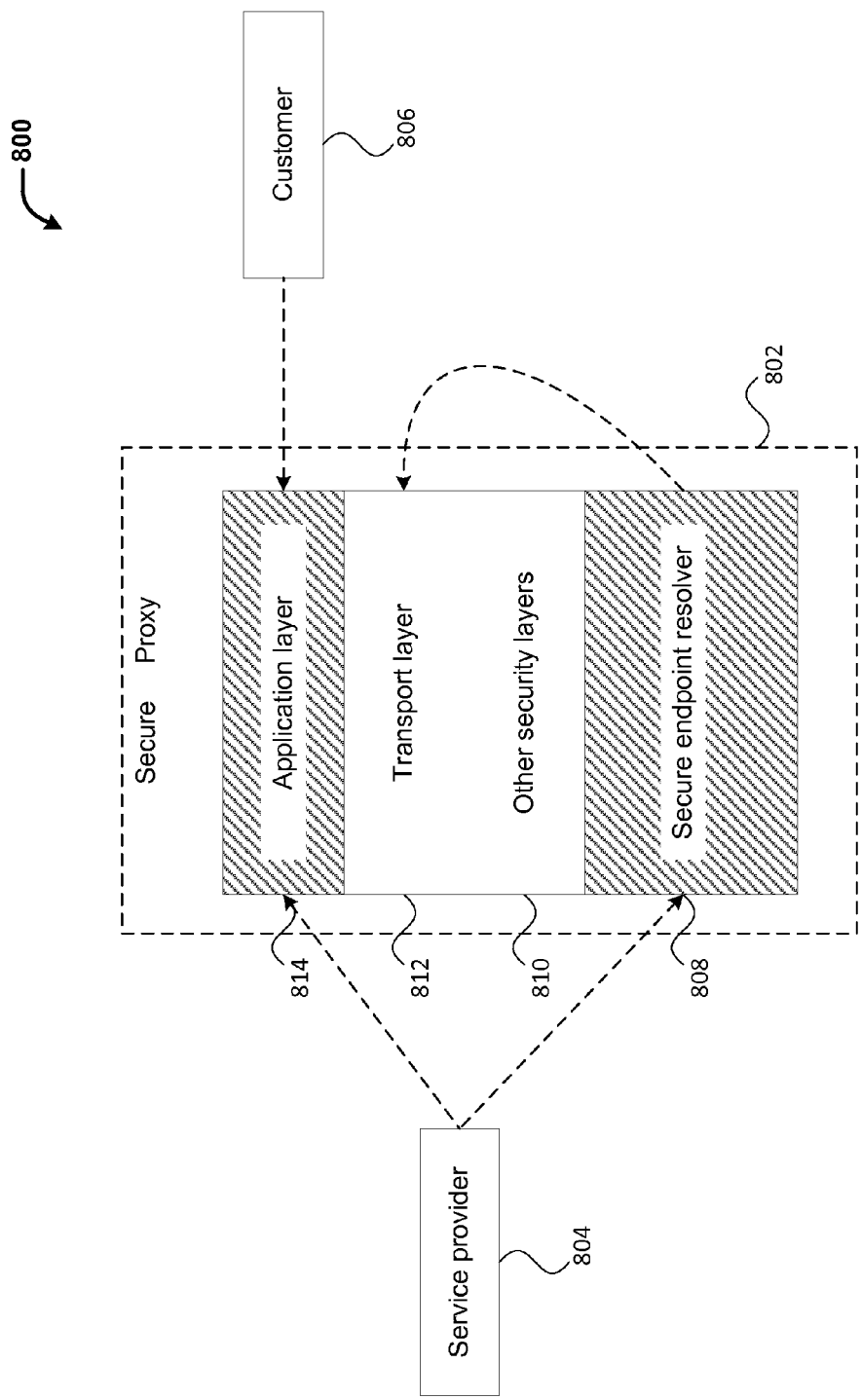
FIG. 8 illustrates updating of secure proxy, in accordance with at least one embodiment.

FIG. 8 illustrates updating of a secure proxy, in accordance with at least one embodiment. As discussed in connection with FIG. 7, various components of a secure proxy may be installed, updated or otherwise configured by various entities. For example, a component of secure proxy 802 may be updated by a service provider 804, a customer 806 and/or other components of secure proxy 802 such as a secure endpoint resolver 808. As described above, updates may be performed together or asynchronously. For example, in an embodiment, one or more components of a secure proxy 802 may be updated as part of an upgrade of an application.

In some embodiments, a service provider 804 may provide one or more updates to a default implementation of secure proxy 802. Such updates may be provided in the form of executable installer files, software or hardware patches, configuration files or any suitable format. In various embodiments, such updates may be "pushed" to a customer or "pulled" by a customer on a periodic basis or up-on a triggering event. For example, such updates may be triggered by changes to interfaces and/or functionalities of services provided by the service provider 804, changes to computing environment of service provider 804 and/or a customer 806, changes to a service level agreement and so on.

As illustrated, a secure proxy 802 may have security layers 810, 812 and 814 that correspond with various network protocol layers (e.g., application layer, transport layer, etc.). In various embodiments, service provider 804 may provide updates to any of the security layers. For example, service provider 804 may provide updates to add, remove or change policies and/or actions associated with one or more security layers 810, 812 and 814. For example, service provider 804 may add additional application-level policies associated with a service due to a heightened security risk or requirement associated with the service or replace existing policies according to a new service schema. In some embodiments, a service provider 804 may also provide updates to the secure endpoint resolver 808. Such updates may be provided in a similar fashion as updates to the security layers, described above. For example, updates to the secure endpoint resolver 802 may be triggered due to changes associated with one or more endpoint services, such as changes to service interface, protocols, parameters and the like.

In some embodiments, one component of the secure proxy 802 may cause update or modification of another component of the secure proxy 802. For example, in an illustrative embodiment, a secure endpoint resolver 802 may cause update of a whitelist or blacklist of IP addresses associated with a security layer, such as a transport layer security layer 812, based at least in part on the resolution of an endpoint query to allow or disallow network traffic to and/or from the certain IP addresses that are determined to be valid by the secure endpoint resolver 802. In some embodiments, the secure endpoint resolver 802 may receive other endpoint-related information such as current endpoint schema, protocol and the like that may be used to update functionalities of the security layers. In some embodiments, updates to security layers may be provided as part of a response to the secure endpoint resolver 808.

In some embodiments, customer 806 may provide updates to components of secure proxy 802. For example, a customer process (automated or manual) may cause changes to configurations associated with any of the security layers 810, 812 and 814 based at least in part on computing resource configuration, security requirement, business requirement, known or predicted network security risks or the like. For example, a customer may add and/or remove IP addresses allowed by the secure proxy 802 to particular applications. For another example, a customer may add, remove or modify application-specific policies to provide better protection of data or network resources in a trusted environment. In some embodiments, customers 806 may also update secure endpoint resolver 802. For example, a customer 806 may modifies configuration files, parameters and other settings of secure endpoint resolver 808 to enable support for additional or different endpoint services, DNS services and other similar services. In various embodiments, a customer 806 may initiate updates to components to secure proxy 802 on a periodic basis or upon a triggering event. As described above, in some embodiments, a customer 806 may have the administrative control over various aspects (such as the timing, location and content) of the installation, configuration and/or updates of components of a secure proxy 802.

Figure 9:
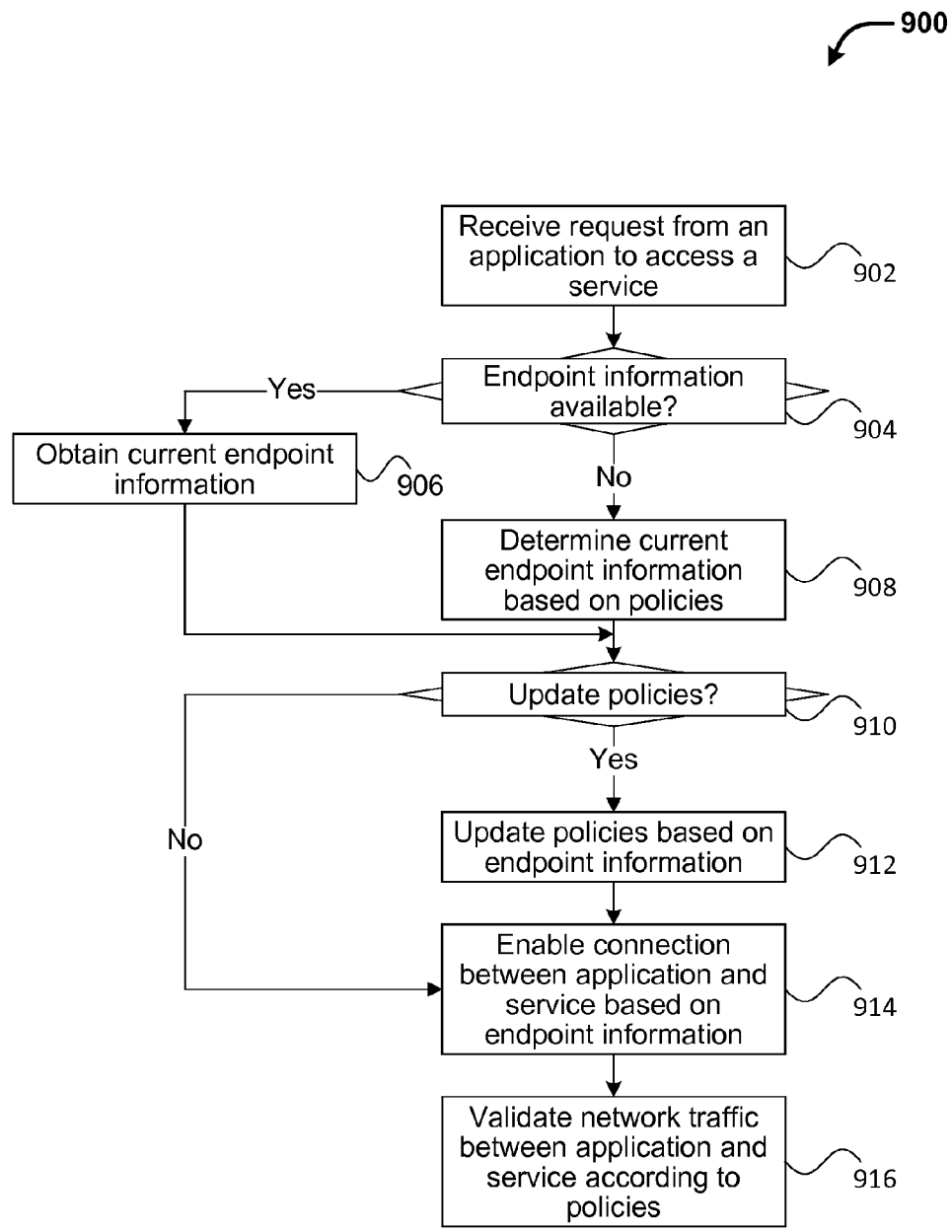
FIG. 9 illustrates a process for managing network traffic, in accordance with at least one embodiment.

FIG. 9 illustrates a process 900 for managing network traffic, in accordance with at least one embodiment. Some or all of the process 900 (or any other processes described herein, or variations and/or combinations thereof) may be performed, in any order and/or in parallel, under the control of one or more computer systems configured with executable instructions and may be implemented as code (e.g., executable instructions, one or more computer programs or one or more applications) executing collectively on one or more processors, by hardware or combinations thereof. The code may be stored in a computer-readable storage medium, for example, in the form of a computer program comprising a plurality of instructions executable by one or more processors. The computer-readable storage medium may be non-transitory. In an embodiment, process 900 may be performed by a secure proxy such as described in connection with FIG. 1 or elsewhere herein.

In some embodiments, a system implementing process 900 may receive 902 a request from an application to access a service. As described in connection with FIG. 1, the application may include a backend data processing application, such as a payment processing application, running in a trusted environment. The service may provide access to various computing resources such as applications, servers, datacenters and the like.

In some embodiments, the request may specify a service endpoint. As described above, a service endpoint may include an identifier of the service such as a URI, DNS name or any global or local unique identifiers (e.g., "ServiceProviderName.ServiceName", "service0284"). In some embodiments, such a service endpoint needs to be resolved to obtain service-specific endpoint information before the service may be utilized. Such endpoint information may include one or more logical or physical machine-recognizable network addresses such as an IP addresses, port numbers and the like where the service may be located. As discussed in connection with FIGS. 1 and 5, endpoint information may also include other service-specific information such as a schema (e.g., a WSDL file), protocol, hardware and/or software characteristics associated with the service and/or service components.

The system implementing process 900 may determine 904 whether the service endpoint information is available. In some cases, some or all of the endpoint information may already be readily available. For example, the request may include the IP address of the service endpoint that may be used directly to locate the service. In some other cases, some or all of the endpoint information may exist in other sources such as a cache. In the case of a cache, the system may look up the cache to determine if the endpoint information associated with the particular service already exists. As discussed above, endpoint information stored in the cache may be valid only for a limited period of time (e.g., 20 seconds) to prevent the use of stale data. If it is determined that the service endpoint information is already available, the system implementing process 900 may simply obtain such endpoint information (e.g., from a cache, configuration file, database or the like). Otherwise, the system may need to determine 908 the current endpoint information from scratch.

In various embodiments, the system implementing process 900 may be configured to communicate with various sources such as one or more endpoint services, DNS services including DNSSEC services or other directory services to determine 908 the current endpoint information associated with a service. In some cases, the system may decrypt, authenticate, validate, combine or otherwise process responses received from any of these sources to determine current endpoint information which may include the current set of IP addresses associated with a service. In some embodiments, such endpoint information may be validated by using policies, such as those associated with security layers as described in connection with FIG. 1. For example, requests for endpoint information may be first validated against the policies to prevent data leaks and/or unauthorized access. Furthermore, responses received from various sources may be validated against the policies to ensure that they are received from valid sources or otherwise free of security risks. Endpoint information may be modified (e.g., removing blacklisted network addresses) based at least in part on existing policies to ensure consistency. Finally, endpoint information thus determined may be stored (e.g., in a file, memory, cache or the like) and/or provided to other components such as the requesting application, process and the like.

In some embodiments, the system implementing process 900 may determine 914 whether policies need to be updated based on service endpoint information. For example, in an embodiment where endpoint information includes a set of network addresses (e.g., IP addresses) currently associated with a service, the set of network addresses may be compared with an access control list (e.g., a whitelist or blacklist) for an application, computer, collection of computers to determine whether the access control list should be updated to allow network traffic to/from such network addresses. Such determination 910 may be made based at least in part on the whether the endpoint information is authenticated or otherwise trustworthy. For example, if network address information is received from a DNSSEC server and has been verified, it may be determined to be valid.

In some embodiments, the system implementing process 900 may update 912 policies based on endpoint information. For example, as discussed above, whitelist/blacklist may be updated to allow additional authenticated IP addresses. For another example, policies may need to be updated based on other endpoint information such as changes to service interface, protocols and the like. For example, if endpoint information includes changes to a service's input data types, then application-level policies for network traffic to that particular service may need to be updated accordingly.

In some embodiments, the system implementing process 900 may enable 914 connection between an application and a service based on the endpoint information. In some embodiments, the connection may be a secure connection based on a cryptographic protocol such as TLS, SSL, IPsec and the like. The connection may be established between the application and a network address that is determined to be valid based at least in part on the endpoint information.

In various embodiments, the system implementing process 900 may proxy the network traffic between the service and the application. Specifically, the system may store and/or intercept inbound/outbound traffic, decrypt/decode at least a portion of the traffic, validate 916 the traffic at various network protocol layers using policies associated with these layers, and encode/encrypt the traffic before blocking or allowing the traffic, which may be modified by as part of the validation 916. In some embodiments, validation 916 includes matching a set of criteria associated with a policy and taking actions associated with the policy if the criteria are matched. Actions associated with a policy may include allowing the traffic through unmodified, modifying or rewriting at least a portion of the traffic and/or blocking the traffic. In some embodiments, the system may also provide logging or messages related to the validation. In various embodiments, policies may evolve over time as service providers, customers or third parties update the policies and/or as part of machine-learning algorithm. For example, a service provider may provide updated service-specific policy updates and a customer may provide updates applicable to a particular application, computer, entire site or the like. For another example, the system implementing process 900 may automatically update the policies based on analysis of access patterns, security risks, changes to network environment and the like.

Figure 10:
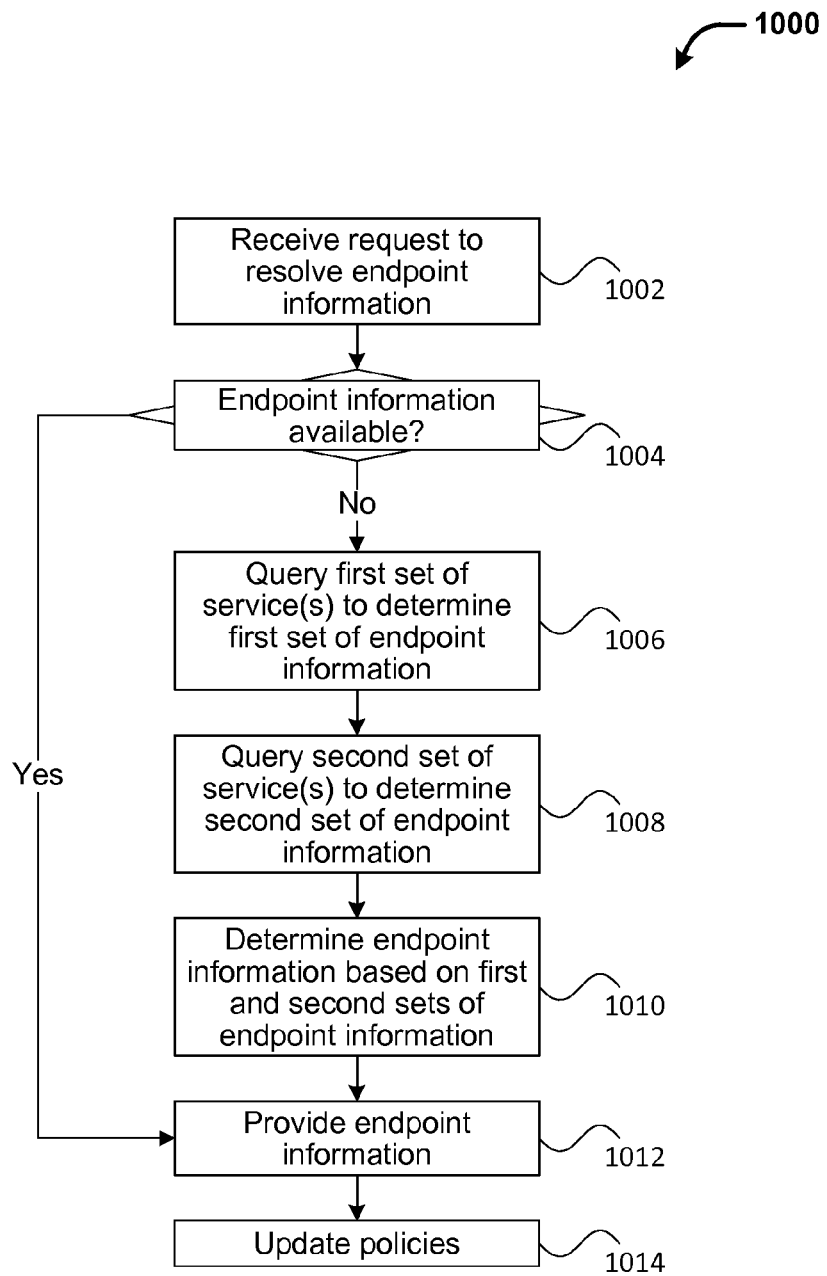
FIG. 10 illustrates a process for resolving endpoint information, in accordance with at least one embodiment.

FIG. 10 illustrates a process 1000 for resolving endpoint information, in accordance with at least one embodiment. In an embodiment, process 1000 may be performed by a secure endpoint resolver such as described in connection with FIG. 1. In some embodiments, the system implementing process 1000 may receive a request to resolve endpoint information associated with a service point. Such requests may be sent as part of processing an application's request to access a service, such as provided by a service provider. In some embodiments, the request to resolve endpoint information includes a service or service endpoint identifier, such as a URI, that identifies the service.

In some embodiments, the system implementing process 1000 may determine 1004 whether endpoint information is already available. The system may look up a local or remote data store, such as a cache, where endpoint information may be stored. If the endpoint information is determined to be available, the system implementing process 1000 may simply retrieve such endpoint information and provides it 1012. Otherwise, if such endpoint information is determined not to be available (e.g., expired or nonexistent), the system implementing process 1000 may obtain such information from scratch, as described below.

In some embodiments, the system implementing process 1000 may query 1006 a first set of services to determine a first set of endpoint information that is associated with the service or service endpoint. The first set of services may include one or more endpoint services provided by a service provider, as described in connection with FIGS. 1 and 5. Querying 1006 such endpoint services may include sending one or more requests that include the service or service endpoint identifier according to the APIs provided by endpoint services. In some embodiments, the system implementing process 1000 may be configured to perform such queries based on configurable information such as the API, network address, credentials, cryptographic keys and the like associated with an endpoint service. Such information may be provided and/or updated by an endpoint service provider. In some embodiments, the system implementing process 1000 may perform further queries based on responses from the endpoint services.

In various embodiments, the system implementing process 1000 may receive one or more responses from the endpoint services that contain endpoint information associated with the service or service endpoint. Such information may include a set of network addresses (e.g., IP addresses), hardware and/or software characteristics, availability, capacity, protocols, usage and other information that is currently associated with the service or service endpoint. Based on the responses, the system implementing process 1000 may determine the first set of endpoint information associated with the service or service endpoint. Such determination may be based on existing policies, priority or trust levels associated with the responses and the like. As described in connection with FIG. 9, the queries and/or responses may be inspected, filtered or otherwise validated against a set of policies to ensure network and data security.

In some embodiments, the system implementing process 1000 may query 1008 a second set of services to determine a second set of endpoint information that is associated with the service or service endpoint. The second set of services may include one or more DNS services provided by a service provider, a third party or the like. Some of such DNS services may support an authentication protocol such as DNSSEC. Querying 1008 such services may include sending one or more DNS lookup queries for the resource records associated with a service endpoint. In some embodiments, the system implementing process 1000 may be configured to perform such queries and process the corresponding responses based on information such as DNS server network address, cryptographic keys, DNS responses (e.g., DNS or DNSSEC resource records) and the like. In various embodiments, an endpoint service provider, DNS service provider and the like may provide and/or update such information as described above.

Based on the responses (such as DNS or DNS resource records), the system implementing process 1000 may determine 1006 the second set of endpoint information associated with the service or service endpoint. Such endpoint information may include IP addresses associated with DNS names. The determination may be based on existing policies, priority or trust levels associated with the responses and the like. For example, DNSSEC resource records that can be authenticated may be deemed more trustworthy than regular DNS resource records. In some embodiments, the system implementing process 1000 may perform further queries, for example, to other DNS or DNSSEC servers. As described in connection with FIG. 9, the queries and/or responses may be inspected, filtered or otherwise validated against a set of policies to ensure network and data security.

In some embodiments, the system implementing process 1000 may determine 1010 the endpoint information currently associated with a service or service endpoint based at least in part on the first and second sets of endpoint information. In various embodiments, the system implementing process 1000 may query only a first set of services, only a second set of services, both sets of services or other services and the final determination may be based on an arbitrary subset of endpoint information received as responses for such queries. In an embodiment, the system implementing process 1000 may simply take the union or intersection of any two or more sets of endpoint information. In other embodiments, the determination may be based on policies, recency and/or trustworthiness of the endpoint information and the like.

In some embodiments, the system implementing process 1000 may provide 1012 the endpoint information associated with a service, for example, to an application to access to the service. In some embodiments, the endpoint information may be stored, for example, in a cache, to expedite subsequent lookup.

In some embodiments, the system implementing process 1000 may optionally update 1014 one or more policies based on the endpoint information, such as described in connection with FIG. 9. For example, a whitelist/blacklist may be updated to allow or block network traffic to/from certain IP addresses based on the endpoint information. As another example, application-level policies may be updated to validate traffic associated with a service or an application according to the updated endpoint information. In various embodiments, some or all of the steps described in process 1000 may be performed to obtain endpoint information or other service-related information associated with one or more services.

Figure 11:
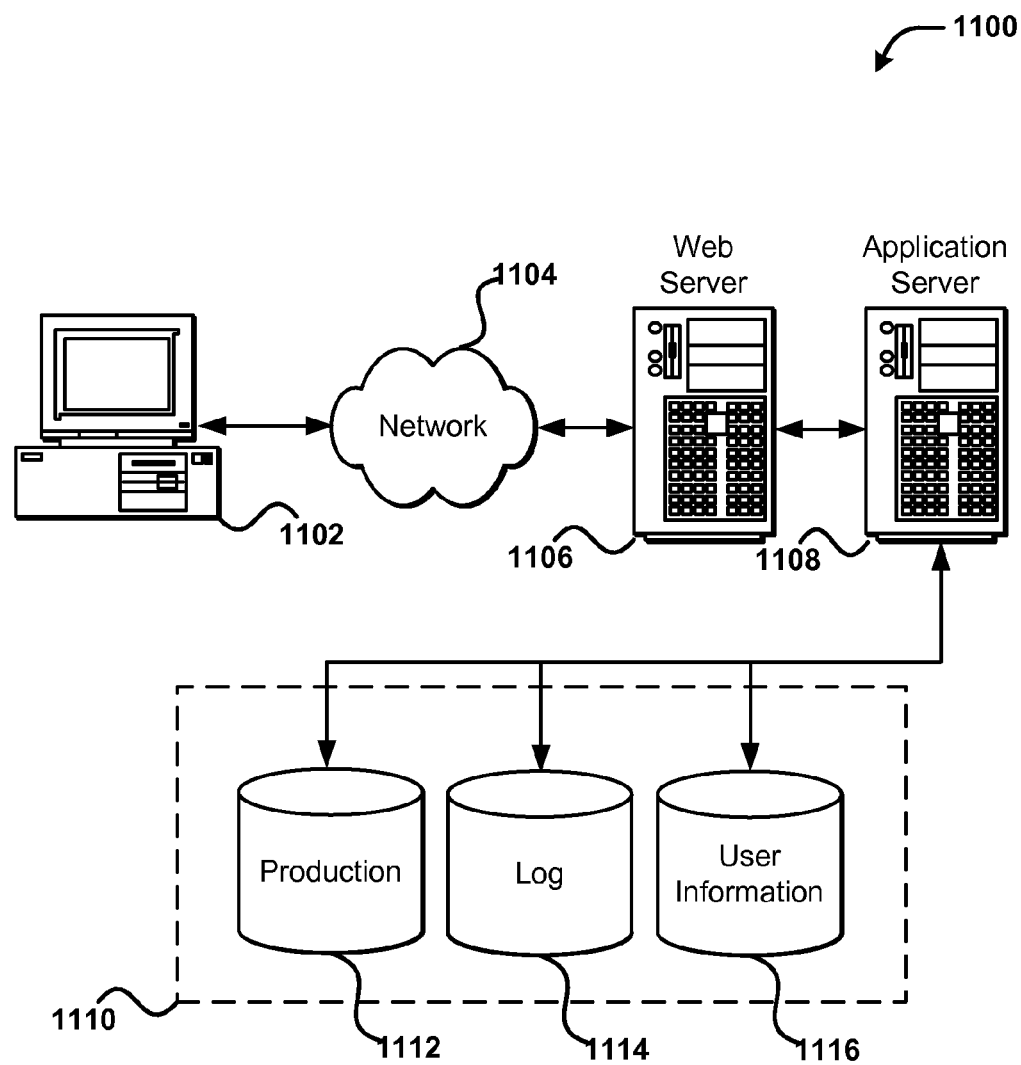
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, at a secure proxy server within a trusted environment, a set of policies including requirements for providing communication with computing resources outside the trusted environment;
   maintaining a set of network addresses associated with a plurality of computing resources, the set of network addresses continuously updated to include network addresses currently associated with the plurality of computing resources;
   receiving, from an application, a request to access a computing resource at an endpoint outside of the trusted environment;
   identifying a subset of the set of policies relevant to the application based at least in part on a network protocol layer to which the computing resource belongs, the subset of policies including:
      a set of criteria including an indication of data fields specific to the network protocol layer; and
      a set of actions to be performed when conditions related to the indicated data fields of the set of criteria are satisfied;
   identifying, from the set of network addresses, a subset of network addresses currently associated with the computing resource that excludes the endpoint, the subset of network addresses identified in accordance with the subset of policies;
   determining an authorized network address of the subset of network addresses to be used in communicating with the computing resource, the authorized network address being one that has been validated using the set of policies;
   establishing a network connection with the computing resource at the authorized network address;
   routing information between the computing resource and the application via the established network connection, the information being subjected to the set of policies; and
   performing at least one action of the set of actions based at least in part on a condition related to the data fields of the set of criteria being met by the information.

2. The computer-implemented method of claim 1, wherein the set of network addresses associated with the plurality of computing resources comprises a whitelist of network addresses.

3. The computer-implemented method of claim 2, further comprising:
   querying one or more domain name system servers to identify a current list of network addresses;
   validating the list of current network addresses according to the set of policies; and
   updating the whitelist of network addresses to include validated network addresses of the list of current network addresses.

4. The computer-implemented method of claim 3, wherein the one or more domain name system servers is at least two different domain name system servers;
   validating the list of current network addresses according to the set of policies comprises comparing a first list of network addresses received from a first domain name system server to a second list of network addresses received from a second domain name system server; and
   updating the whitelist of network addresses to include validated network addresses of the list of network addresses comprises adding network addresses that appear in both the first list of network addresses and the second list of network addresses to the whitelist.

5. The computer-implemented method of claim 1, wherein determining the authorized network address of the subset of network addresses comprises selecting a network address based on one or more attributes of a server located at the network address.

6. The computer-implemented method of claim 5, wherein the one or more attributes is one of bandwidth, capacity, geographic region, security, or availability.

7. A secure proxy device comprising:
   one or more processors;
   one or more security layers configured to enforce a set of policies on network traffic passing through the one or more security layers, the set of policies including:
      a set of criteria including an indication of data fields specific to the one or more security layers; and
      a set of actions to be performed when conditions related to the indicated data fields of the set of criteria are met; and
   memory, including instructions executable by the one or more processors to cause the secure proxy device to at least:
      receive a set of network addresses associated with a plurality of computing resources, the network addresses periodically updated;
      generate a subset of the set of network addresses to include network addresses of the set of network addresses validated in accordance with the set of policies;

receive, from an application, a request to access a computing resource of the plurality of computing resources;

determine, based at least in part on the set of policies, a valid network address from the subset of the set of network addresses;

establish a communication session with the computing resource at the valid network address; and relay network traffic between the application and the computing resource through the one or more security layers; and perform at least one action of the set of actions on the network traffic upon determining that conditions related to the indicated data fields of the set of criteria are met.

8. The system of claim 7, wherein the computing resource is a computing platform providing at least one of an operating system, a web server, a database management service, or a programming language execution environment.

9. The system of claim 7, wherein at least one action of the set of actions included in the set of policies is an action to conform data in network traffic to schema definitions or protocols.

10. The system of claim 7, wherein the one or more security layers are configured to encrypt, decrypt, or authenticate network traffic according to the set of policies.

11. The system of claim 10, wherein at least one piece of information necessary to encrypt, decrypt, or authenticate network traffic is provided by the application.

12. The system of claim 11, wherein the at least one piece of information is one of an encryption key, a decryption key, or credentials.

13. The system of claim 7, wherein at least a subset of the set of policies are specific to the application.

14. The system of claim 7, wherein at least a subset of the set of policies are specific to a client from which the request was received.

15. A non-transitory computer readable medium storing specific computer-executable instructions that, when executed with a processor, cause a computer system to at least:

receive, with respect to a number of computing resources located in an untrusted computing environment, a set of current network addresses, the set of current network addresses being periodically updated;

receive, from an application, a request to interact with a computing resource of the number of computing resources;

determine a set of policies relevant to the computing resource based at least in part on a network protocol layer to which the computing resource belongs, the set of policies including:
  a set of criteria including an indication of data fields specific to the network protocol layer; and
  a set of actions to be performed when conditions related to the indicated data fields of the set of criteria are met;

verify a subset of the set of current network addresses are in compliance with the set of policies;

identify a network address in the subset of the set of current network addresses associated with the computing resource that is different from the endpoint;

establish a connection with the computing resource at the network address;

relay information between the application and the computing resource via the established connection; and perform, according to the set of policies, at least one action of the set of actions on the information relayed between the application and the computing resource.

16. The non-transitory computer readable medium of claim 15, wherein the computing resource is a computing infrastructure providing at least one of data storage, load balancing, virtual local area network, or a data center.

17. The non-transitory computer readable medium of claim 15, wherein the at least one action comprises formatting the information to conform to a schema associated with the computing resource.

18. The non-transitory computer readable medium of claim 15, wherein the at least one action comprises validating the network address of information relayed from the application to the computing resource.

19. The non-transitory computer readable medium of claim 15, wherein the at least one action comprises validating a type of at least one data field of the data fields specific to the network protocol layer of information relayed from the application to computing resource.

20. The non-transitory computer readable medium of claim 15, wherein the set of policies include configuration files stored as one or more formats.

* * * * *